United States Patent [19]

Brupbacher et al.

[11] Patent Number: 4,710,348
[45] Date of Patent: Dec. 1, 1987

[54] PROCESS FOR FORMING METAL-CERAMIC COMPOSITES

[75] Inventors: John M. Brupbacher; Leontios Christodoulou; Dennis C. Nagle, all of Baltimore, Md.

[73] Assignee: Martin Marietta Corporation, Bethesda, Md.

[21] Appl. No.: 943,899

[22] Filed: Dec. 19, 1986

Related U.S. Application Data

[63] Continuation of Ser. No. 662,928, Oct. 19, 1984, abandoned.

[51] Int. Cl.$^4$ .................................................. C22C 1/00
[52] U.S. Cl. ......................................... 420/129; 420/590
[58] Field of Search ................................. 420/590, 129

[56] References Cited

U.S. PATENT DOCUMENTS

| | | | |
|---|---|---|---|
| 2,852,366 | 9/1958 | Jenkins | 75/201 |
| 3,037,857 | 6/1962 | Conant | 75/138 |
| 3,194,656 | 7/1965 | Vordahl | 420/590 |
| 3,547,673 | 12/1970 | Bredzs et al. | 117/22 |
| 3,666,436 | 5/1972 | Bredzs et al. | 75/0.5 R |
| 3,672,849 | 6/1972 | Bredzs et al. | 29/195 |
| 3,690,849 | 9/1972 | Bredzs et al. | 29/182.5 |
| 3,690,875 | 9/1972 | Bredzs et al. | 75/202 |
| 3,705,791 | 12/1972 | Bredzs | 29/195 |
| 4,007,062 | 2/1977 | Sifferlen | 148/437 |
| 4,514,268 | 4/1985 | DeAngelis | 204/67 |

FOREIGN PATENT DOCUMENTS 0113249 7/1984 European Pat. Off. .

OTHER PUBLICATIONS

Maksimov et al., "Mechanism of Product Structure Formation in Processing of Self-Propagating High-Temperature Synthesis", translated from DAN SSSR, vol. 276, No. 4, pp. 891–894, Jun. 1984; Plenum Publishing Corp., 1984.

Maksimov et al., "High Temperature Synthesis of the Ti–B–Fe System", translated from Izvestiya Akademii Nauk SSSR, Metally, No. 2, pp. 218–223, 1985; Allarton Press, 1985.

Primary Examiner—Christopher W. Brody
Attorney, Agent, or Firm—Herbert W. Mylius; Gay Chin

[57] ABSTRACT

A method is taught for the in-situ precipitation of ceramic materials in a metal matrix. By means of the solvent assisted reaction, metal-ceramic composites having highly superior properties may be obtained. The invention involves the reaction of the ceramic forming constituents in a metal solvent medium to provide very finely-dispersed ceramic particles in the metal matrix. Exemplary materials include titanium diboride in an aluminum matrix.

43 Claims, 4 Drawing Figures

PROCESS FOR FORMING METAL-CERAMIC COMPOSITES

This application is a continuation of application Ser. No. 662,928, filed Oct. 19, 1984, now abandoned.

BACKGROUND OF THE INVENTION

The present invention comprises a process for the in-situ precipitation of ceramic material in a metallic matrix, wherein the ceramic comprises a boride, carbide, oxide, nitride, silicide, etc., of one or more metals other than the matrix metal. The matrix metal, moreover, may constitute an alloy of two or more metals.

For the past several years, extensive research has been devoted to the development of metal matrix composites, such as aluminum reinforced with carbon, boron, silicon carbide, silica, or alumina fibers, whiskers, or particles. Metal matrix composites with excellent high temperature yield strengths and creep resistance have been fabricated by the dispersion of very fine (less than 0.1 micron) oxide or carbide particles throughout the metal or alloy matrix. The production of such dispersion-strengthened composites is conventionally accomplished by mechanically mixing metal powders of approximately 5 micron diameter or less with the oxide or carbide powder (preferably 0.01 micron to 0.1 micron). High speed blending techniques or conventional procedures such as ball milling may be used to mix the powder. Standard powder metallurgy techniques are then employed to form the final composite. Conventionally, however, the ceramic component is large, i.e. greater than 1 micron, due to a lack of availability, and high cost, of such small particle size materials. Further, in many cases where the particulate materials are available in the desired size, they are extremely hazardous due to their pyrophoric nature.

Alternatively, molten metal infiltration of a ceramic mat has been used to produce composites. In some cases elaborate particle coating techniques have been developed to protect ceramic particles from molten metal during molten metal infiltration. Techniques such as this have resulted in the formation of silicon carbide-aluminum composites, frequently referred to as SiC/Al, or SiC aluminum. This approach is suitable for large particulate ceramics (e.g. greater than 1 micron) and whiskers. The ceramic material, such as silicon carbide, is pressed to form a compact, and liquid metal is forced into the packed bed to fill the intersticies. Such a technique is illustrated in U.S. Pat. No. 4,444,603, of Yamatsuta et al, issued Apr. 24, 1984.

The presence of oxygen in ball-milled powders used in the prior art metallurgy techniques, or in molten metal infiltration, can result in oxide formation at the interface of the ceramic and the metal. The presence of such oxides will inhibit interfacial binding between the ceramic phase and the matrix, thus adversely effecting ductility of the composite. Such weakened interfacial contact can also result in reduced strength, loss of elongation, and crack propagation.

Internal oxidation of a metal containing a more reactive component has also been used to produce dispersion strengthened metals, such as internally oxidized aluminum in copper. For example, when a copper alloy containing about 3 percent aluminum is placed in an oxidizing atmosphere, oxygen may diffuse through the copper matrix to react with the aluminum, precipitating alumina. This technique, although limited to relatively few systems, has offered a preferred method for dispersion hardening.

In U.S. Pat. No. 2,852,366, of Jenkins, it is taught that up to 10 percent by weight of a metal complex can be incorporated into a basis metal or alloy. The patent teaches blending, pressing, and sintering a mixture of a base metal, a base metal compound of the non-metallic complexing element, and an alloy of the base metal and the complexing metal. Thus, for example, the reference teaches mixing powders of nickel, a nickel-titanium alloy, and a nickel-boron alloy, pressing, and sintering the mixed powders to form a coherent body in which a stabilizing unprecipitated "complex" of titanium and boron is dispersed in a nickel matrix. Precipitation of the complex phase is specifically avoided.

In recent years, numerous ceramics have been formed using a process referred to as self-propagating high-temperature synthesis (SHS), which involves an exothermic, self-sustaining reaction which propagates through a mixture of compressed powders. Generally the SHS process takes place at super atmospheric pressures, and is ignited by electrical impulse, thermite, or spark. The SHS process involves mixing and compacting powders of the constituent elements, and igniting the green compact with a suitable heat source. On ignition, sufficient heat is released to support a self-sustaining reaction, which permits the use of sudden, low power initiation of high temperatures, rather than bulk heating over long times at lower temperatures. Exemplary of these techniques are the patents of Merzhanov et al. In U.S. Pat. No. 3,726,643, there is taught a method for producing high-melting refractory inorganic compound by mixing at least one metal selected from groups, IV, V, and VI of the Periodic System with a non-metal such as carbon, boron, silicon, sulfur, or liquid nitrogen, and heating the surface of the mixture to produce a local temperature adequate to initiate a combustion process. In U.S. Pat. No. 4,161,512, a process is taught for preparing titanium carbide by ignition of a mixture consisting of 80-88 percent titanium and 20-12 percent carbon, resulting in an exothermic reaction of the mixture under conditions of layer-by-layer combustion. These references deal with the preparation of ceramic materials, absent the presence of a binder.

Similarly, U.S. Pat. No. 4,431,448 teaches preparation of a hard alloy by intermixing powders of titanium, boron, carbon, and a Group I-B binder metal, such as copper or silver, compression of the mixture, local ignition thereof to initiate the exothermic reaction of titanium with boron and carbon, and propagation of the ignition, resulting in an alloy comprising titanium diboride, titanium carbide, and the binder metal.

This reference, however, is limited to the use of Group I-B metals such as copper and silver, as binders, and requires local ignition. Products made by this method have low density, requiring subsequent compression and compaction.

SUMMARY OF THE INVENTION

It is an object of the present invention to provide an inexpensive method for forming composite materials, consisting of finely dispersed particulate ceramic or intermetallic materials in metal, metallic alloy, or intermetallic matrices.

It is a further object of this invention to provide a method for dispersion hardening of metals and alloys. It is a particular object of this invention to provide a method for the formation of submicron titanium diboride particulates in an aluminum matrix, without the necessity for utilizing expensive submicron starting materials.

The present invention relates to a process for the in-situ precipitation of up to about 95 percent by weight of a ceramic material in a metallic matrix, wherein the ceramic comprises a boride, carbide, oxide, nitride, silicide, aluminide, selenide, sulfide, or germanide, of a metal other than the matrix metal. It has been found that by mixing the constituents or elements of the desired ceramic material with a solvent matrix metal, and heating to a temperature at which substantial diffusion and/or solvation of the reactive elements in the matrix can occur, typically, close to the incipient melting point of the solvent matrix metal, a solvent assisted reaction, which is generally exothermic, can be initiated. This solvent assisted reaction results in the extremely rapid formation and dispersion of finely divided particles of the ceramic material in the metal matrix. While this invention may be associated with pure metal systems, it is also applicable to alloys wherein at least two alloying elements react to form a ceramic precipitate in a matrix of the metal or an alloy thereof.

DESCRIPTION OF PREFERRED EMBODIMENTS

Figure 1:
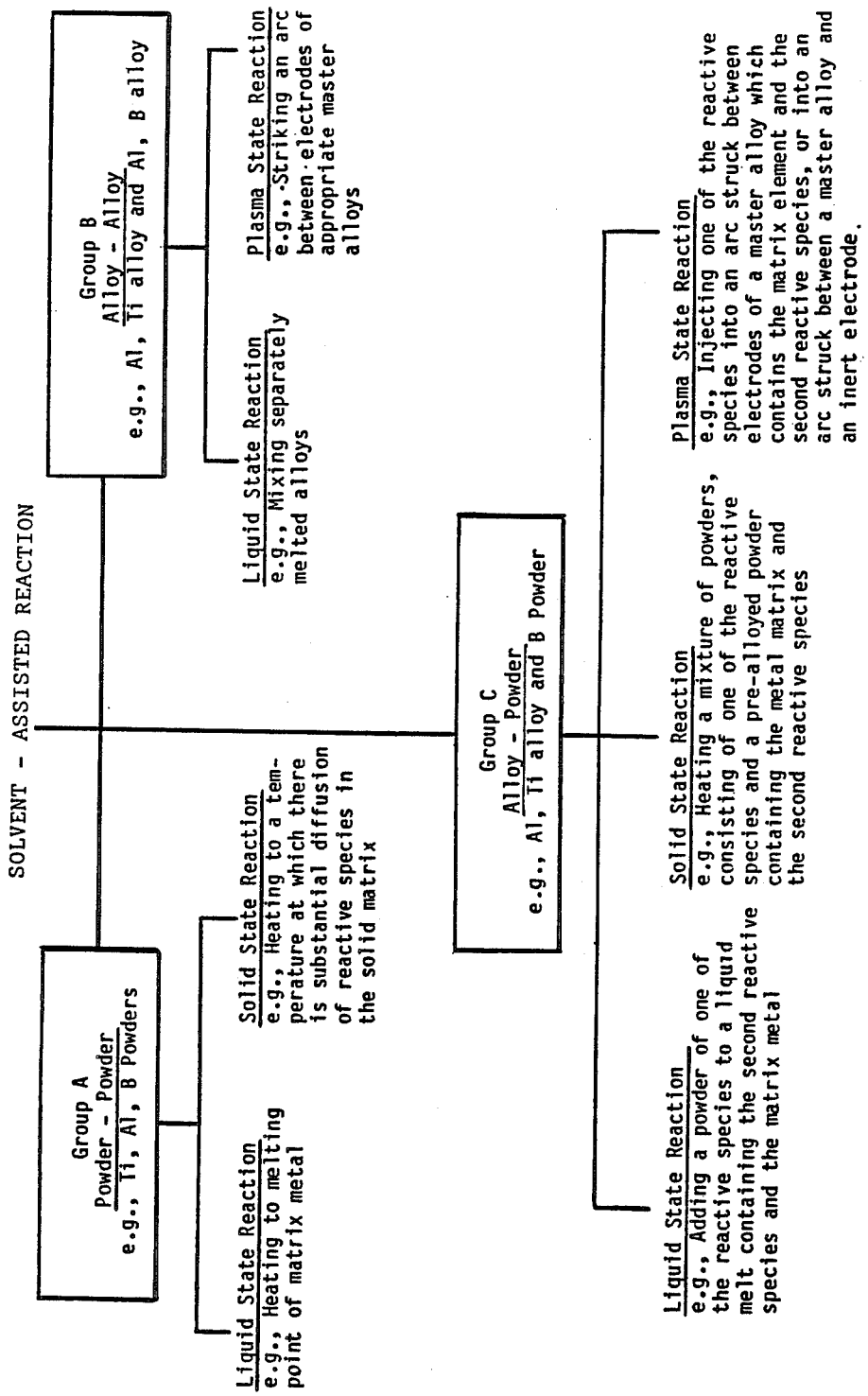
FIG. 1 represents a schematic presentation of the various reaction modes and states within the scope of this invention.

The present invention is particularly directed to a novel process for the in-situ precipitation of fine particulate ceramics, or intermetallics, such as refractory hard metal borides or aluminides, within metal and alloy systems to produce a metal matrix composite having enhanced mechanical properties, such as high elastic modulus, high-temperature stability, and improved wear resistance. However, the process described may also be employed for producing larger particles of the ceramic material in the chosen matrix, up to the point at which such larger particles result in component embrittlement, or loss of ductility, etc. Such improved properties offer weight-savings in stiffness limited applications, higher operating temperatures and associated energy efficiency improvements, and reduced wear in parts subject to erosion. A specific application of such materials is in the construction of turbine engine components, such as blades.

Broadly stated, the present invention constitutes a method whereby ceramic forming elements react in a solvent metal to form a finely-divided dispersion of the ceramic material in the solvent metal matrix. Surprisingly, it has been found that the reaction commences, or is initiated, at a temperature far below the temperature conventionally associated with the reaction sought. In accordance with the present invention, the ceramic-forming constituents most easily combine at or about the melting temperature of the solvent metal, and the exothermic nature of this reaction causes a very rapid temperature elevation or spike, which has the effect of melting additional metal, simultaneously causing the further reaction of the ceramic constituents.

Alternatively, in systems where the reactive elements have substantial diffusivity in the solid matrix metal, the reaction may be initiated at temperatures well below the melting point of the matrix metal. Thus, a solid state reaction is possible, wherein a liquid state may or may not be achieved.

Exemplary of suitable ceramic precipitates are the borides, carbides, oxides, nitrides, silicides, aluminides, selenides, sulfides, and germanides. Suitable elements include all of the elements which are reactive to form ceramics, including, but not limited to, transition elements of the third to sixth groups of the Periodic Table. Particularly useful ceramic-forming or intermetallic compound forming constituents include aluminum, titanium, silicon, boron, molybdenum, tungsten, niobium, vanadium, zirconium, chromium, hafnium, yttrium, cobalt, nickel, and iron. Additional elements suitable for inclusion as ceramic constituents include magnesium, carbon, selenium, tantalum, gallium, manganese, germanium, zinc, arsenic, antimony, lithium, and thorium.

As the matrix metal, or solvent metal, one may use any metal capable of dissolving or sparingly dissolving the constituents of the ceramic phase, and having a lesser capability for dissolving the ceramic precipitate. Thus, the matrix metal component must act as a solvent for the reaction species, but not for the desired ceramic precipitate. It is to be noted that the matrix metal acts primarily as a solvent in the process of the present invention, and that the constituents of the ceramic precipitate have a greater affinity for each other than either has for the solvent metal.

Suitable matrix metals include aluminum, gallium, nickel, titanium, copper, vanadium, chromium, manganese, cobalt, iron, silicon, germanium, palladium, rhodium, ruthenium, silver, gold, platinum, magnesium, lead, zinc, tin, and alloys of such metals. When alloys are utilized, one may retain the beneficial properties of said alloys, and increase the modulus of elasticity, high temperature stability, and wear resistance, although some loss of ductility may be encountered in certain soft alloys. For example, 7075 aluminum alloy, containing from about 5 percent to about 40 percent by weight titanium diboride, responds to age-hardening in the same fashion that the 7075 alloy alone does, but exhibits a substantial increase in modulus of elasticity, higher temperature capability, greater high temperature stability, and extremely high wear resistance. Further, the composite of the present invention may be fabricated in conventional fashion, by forging, extruding, rolling, machining, etc.

Varying amounts of ceramic may be incorporated into the composite material, depending upon the end use and the properties desired in the product. For instance, for dispersion strengthened alloys having high modulus, one may utilize a preferred range of from about 10 percent by volume to about 25 percent by volume (15 percent to 40 percent by weight, depending on specific ceramic phase and matrix employed). However, the ceramic volume fraction for dispersion strengthening may be varied considerably, so as to produce a composite with the desired combination of properties, within the range of from about 1 percent by volume up to the point at which ductility is sacrificed to an unacceptable extent. In contrast, cermets of up to about 95 percent or more by volume of ceramic material in the metal matrix may be produced. The primary determining factors in such utilization as cutting tools will be the wear and chipping resistances of the composite material produced. Preferred ranges for cermet materials will, of course, be dependent upon the desired end use. It is possible to effectively tailor the composition to achieve any desired properties by controlling the proportions of the reactant and solvent materials. For instance, the modulus of elasticity may be approximated by the "Rule of Mixtures" such that the appropriate proportions of starting materials are employed.

Utilizing such procedures, it is possible to prepare "Master Concentrates", containing a ceramic phase, which may be utilized to introduce the ceramic phase into a diluent metal in controlled fashion. Thus, one may prepare a master concentrate of a high percentage of titanium diboride in aluminum, and add metal to achieve a composite having the desired concentration of ceramic. In fact, an ingot of unreacted components, such as titanium, boron, and aluminum, may be utilized as a grain refiner for aluminum. When such an ingot is introduced into the molten aluminum, the reaction produces nuclei for grain refining. A wide range of such materials for different metallurgical applications exists.

A comparison of various properties of composites made in accordance with the present invention with those of a conventional SiC/aluminum material is shown in Table I. As can be seen, considerable improvements in modulus of elasticity and elongation are achieved.

TABLE I

| Material | Hardness Rockwell C | Modulus $10^6$ lbs/in$^2$ | Typical Elongation % |
| --- | --- | --- | --- |
| 7075 Al | 75 | 10.3 | 7 |
| 7091-20 vol % SiC (Forging) | 90–100 | 16.7 | 1.8 |
| 7075-15 vol % TiB$_2$ (Forging) | 90–100 | 18 | 4.0 |

Three basic reaction modes have been identified in accordance with the present invention as illustrated in FIG. 1. In the first mode, Group A of FIG. 1, the starting materials constitute individual powders of each of the solvent metal and the individual constituents of the ceramic to be formed. For example, one may react a mixture of aluminum, titanium, and boron, to form a dispersion of titanium diboride in an aluminum matrix.

In the second mode of the invention, Group B of FIG. 1, one may react individual alloys of a common metal, one such alloy comprising an alloy of the solvent metal with one of the constituents of the ceramic, and the other comprising an alloy of the solvent metal and the other constituent of the ceramic. As an example, one may react a mixture of aluminum-titanium alloy with aluminum-boron alloy, to form a dispersion of titanium diboride in aluminum. This alloy-alloy reaction route may, in some cases, be relatively slower than the elemental route, yet may offer economic advantages because the alloys utilized can be cheaper than the elemental powders. In this case, the preferred form is that of separately melting master alloys containing the chosen elements and mixing them in the molten state, forming a mass in which the dissolved matrix element acts as a liquid solvent for the constituents of the ceramic.

The third reaction mode, Group C of FIG. 1, constitutes a combination, or intermediate, of the first two modes discussed above. Thus, one may react a premixed alloy containing one reactive species and the matrix metal, with an elemental powder of the second reactive species, such as combining an aluminum-titanium alloy with elemental boron powder. This reaction mode may be relatively more expensive than the alloy-alloy reaction mode, but offers a more rapid reaction, which in turn permits formation of finer grain precipitates than obtainable by the alloy-alloy route. However, the alloy-elemental powder reaction mode could be relatively less expensive, although slower, than the elemental powder mode, in most cases.

Moreover, the three reaction modes may occur in different physical states. Each of the first two basic modes of the solvent assisted reaction may occur in either of two states. The elemental powders can react to form the desired second phase via diffusion of the reactive species through the liquid solvent or, in cases where diffusion is very rapid, in a solid state. Similarly, in the case where two alloys are used, each containing an alloying element constituting a reactive component, the reaction can occur in the liquid state, or in a plasma state achieved by striking an arc between electrodes of the two alloys. The third reaction mode, however, may function in all three states. That is, the reaction of an alloy with an elemental powder may be conducted as a liquid state reaction, a solid state reaction, or in the plasma state. The full range of reaction states is shown in FIG. 1.

It is also to be noted that complex compounds, as well as plural ceramic phases, may be precipitated by these three reaction modes. Thus, solvent matrix combinations with complex ceramics such as titanium zirconium boride, may be prepared.

Figure 2:
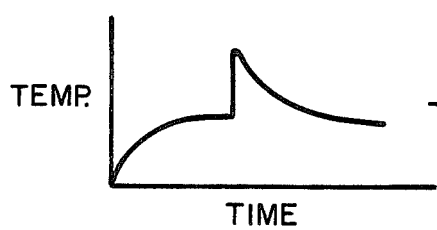
FIG. 2 represents a schematic presentation of two of the basic reaction modes of the present invention.

It is particularly to be noted that the prior art teaches that the combination of elemental powders, particularly of a coarse particulate size, would yield intermetallic compounds. In fact, conventional techniques for forming intermetallics involve reacting a mixture of powders of titanium and aluminum, to form titanium aluminide, and a mixture of powders of boron and aluminum to form aluminum diboride. Thus, one would anticipate that a mixture comprising powders of titanium, aluminum, and boron would yield an aggregate agglomeration of titanium aluminide, boron aluminide, and possibly, titanium diboride. In contrast, the present invention provides for the formation of one finely dispersed precipitate in a matrix of the third component. It is important that the ceramic precipitate material is not soluble in the solvent metal, while the constituents of the ceramic, individually, are at least sparingly soluble in the solvent metal. Thus, the exothermic dispersion reaction mechanism depends upon a certain amount of each ceramic forming constituent dissolving and diffusing in the solvent metal, and while in solution (either liquid or solid state), reacting exothermically to form the insoluble ceramic, which precipitates rapidly as a very fine particulate. This is illustrated in FIG. 2. The solvent metal, provides a medium in which the reactive elements may diffuse and combine. Once the initial reaction has occurred, the heat released by the exothermic reaction causes additional diffusion of reactive components in the solvent metal to heat more than a localized portion of the mixture to initiate reaction unlike known techniques, and drives the reaction to completion.

Figure 3:
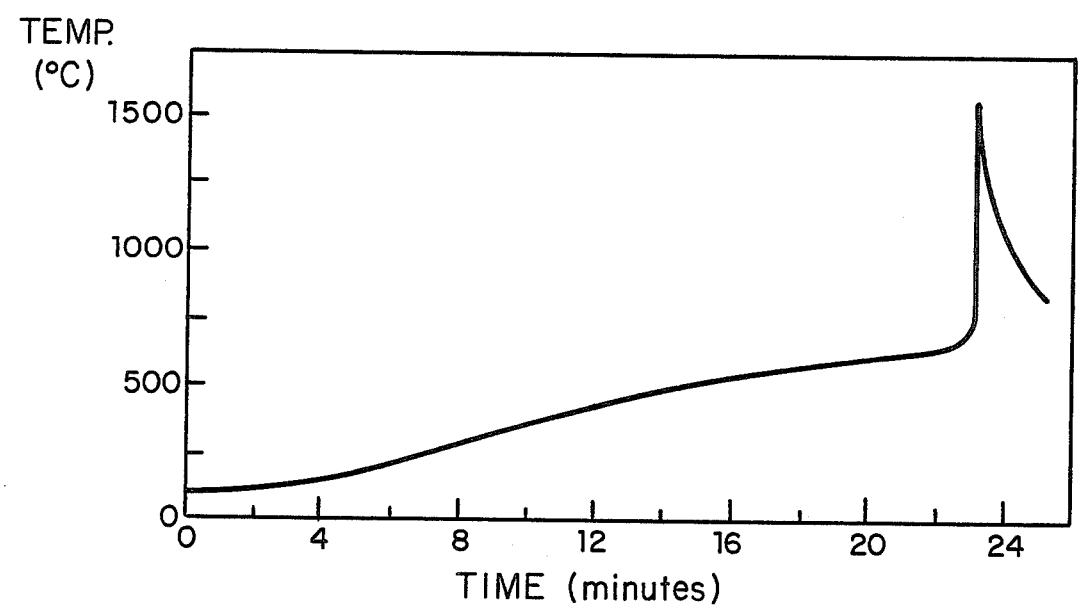
FIG. 3 represents a typical time-temperature profile of the solvent assisted reaction.

This is illustrated by FIG. 3, which demonstrates a temperature trace of a mixture constituting 22 percent titanium, 10 percent boron, and 68 percent aluminum powders. The mixture was placed in a crucible, and placed in a furnace which was heated to 735° C. The temperature readings were obtained by a thermocouple placed against the specimen. A plateau exists on the temperature trace, indicating absorption of energy, attributable to localized melting, and the initiation of substantial diffusion of the reactive components. The temperature trace then illustrates the solvent assisted initiation of the reaction of the reactive constituents, and the very rapid temperature increase associated therewith. As shown by the temperature trace illustrated in FIG. 3, extremely high temperatures may be achieved in very short periods of time. During this time frame, essentially all of the reactive components in the solvent metal react to form the insoluble ceramic, which immediately precipitates.

The cool-down period following initiation of the reaction and consumption of the reactive constituents is believed critical to achieving very small grain size, and limiting grain growth. It is known that at high temperatures, it is possible for the ceramic particles to grow, e.g. by agglomeration. This should also be avoided, because of the negative effect of large particle sizes on ductility. The cool-down or quenching of the reaction is, in a sense, automatic, since once the ceramic forming constituents are completely reacted, there is no further energy released to maintain the high temperatures achieved. However, one may control the rate of cool-down to a certain extent by control of the size and/or composition of the mass of material reacted. That is, large thermal masses absorb energy, and cool down more slowly, thus permitting growth of larger particles, such as may be desired for greater wear resistance, e.g. for use in cutting tools. It is recognized that if it is desired to rapidly cool the reaction mass to an intermediate temperature, one may achieve this by the introduction of a stream of cool inert gas, such as helium. Thus, the temperature may be rapidly reduced from the maximum temperature attained to a temperature where grain growth is minimal. In terms of temperatures that cause coarsening of the particle size, temperatures in the region of 1000° C. are not generally believed to have substantial impact on particle growth. However, at temperatures in the region of 1600° C. and higher, grain growth can occur over extended time periods. For example, silicon nitride may begin to grow at 1600° C., over a period of days, whereas titanium diboride will not begin to exhibit grain growth below about 1800° C. The incidence of particle growth will depend on the particular ceramic phase being formed.

Further, slowly cooling the reaction product is in some cases advantageous, since rapid quenching of some metal-ceramic composites as are formed by this invention may result in a high incidence of fracturing due to thermal stresses.

The reaction temperature has generally been found to be relatively close to the melting temperature of the solvent metal utilized in liquid state reactions. For example, in the production of titanium diboride in an aluminum matrix, the reaction proceeds at a temperature around 650° C., or very close to the melting point of the aluminum solvent. It should be noted that in the absence of a solvent metal, the reaction of titanium and boron to form titanium diboride was not observed to proceed below a temperature of about 1200° C., and generally will produce large crystallites having a particle size at least as large as the starting materials. While one need not actually reach the melting temperature, one must achieve a temperature where localized or incipient melting occurs, or a state where substantial diffusion of the reactive species in the solvent metal can occur. It is observed that, in some cases, as one increases the temperature it is possible for the starting constituents to diffuse into the matrix solvent metal, forming an alloy therewith having a lower melting temperature than the matrix metal, and thus lowering the reaction initiation temperature.

It is noted that with respect to impurities, the solvent metal may be alloyed at will, while in the reactive constituents, a limited amount of alloying element or impurity may be tolerated. It has been found that an impurity with which a reactive constituent forms a stable compound may not exceed approximately 10 percent by volume. For example, the presence of magnesium in boron will inhibit the formation of titanium diboride in an aluminum matrix by forming a magnesium-boron complex on the surface of the boron particles, thus limiting diffusion of the boron in the matrix. The presence of magnesium in the aluminum, however, does not have this effect. That is, boride forming materials in the boron itself will inhibit the desired dissolution or diffusion of the boron and its subsequent reaction to form titanium diboride.

It is also to be noted that in accordance with the present invention, one may casue the complex precipitation of a plurality of systems. There is no real limit on the number of ceramic phases which can be precipitated. Thus, it is possible to precipitate complex phases, such as $Ti(B_{0.5}C_{0.5})$, or alternatively, to precipitate a mixture of titanium diboride and zirconium diboride in an aluminum matrix, in accordance with the reaction:

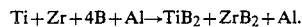

$$Ti+Zr+4B+Al \rightarrow TiB_2+ZrB_2+Al.$$

It is also possible to achieve a low temperature solvent assisted reaction in a metal matrix which has a high melting temperature by alloying the high melting solvent metal with a minor proportion of a lower melting metal. For example, titanium diboride has been precipitated at very low temperatures, such as 620° C., in cobalt, chromium, and nickel matrices, by including up to 20 percent by weight aluminum powder. In the absence of the alloying aluminum, the reaction requires temperatures of about 800° C. or greater.

It is further possible to prepare ceramic-ceramic composites, i.e. a dispersion of particulate ceramic material in a ceramic matrix. This may be accomplished by the in-situ precipitation of a ceramic phase from a solvent-/matrix metal, followed by conversion of the matrix metal to a ceramic by reacting it with a secondary gaseous reactant.

In accordance with the present invention it has been found that the powders need not be compacted prior to firing, but doing so allows easier diffusion and thus initiation at lower temperatures. For instance, loose powder mixtures of aluminum, titanium and boron do not react until approximately 660° C. whereas highly compacted powders react at approximately 620° C. This is due to localized incipient melting, and increased diffusion, which are possible when the powders are in close proximity.

Porosity of the final composite can be minimized by a vacuum degassing operation prior to initiation of the reaction. The degree of vacuum applied and temperature of the degassing step is determined purely by the kinetics of evaporation and diffusion of any absorbed moisture or other gasses. High vacuum and elevated temperatures aid the degassing operation. In the case of titanium, aluminum, and boron mixtures, however, the pre-reacted compact must not be exposed to temperatures above 300° C. for prolonged periods of time as this will induce the volatilization of some components and induce the formation of titanium aluminide by solid state diffusion. This is undesirable because it forms as large plates which are detrimental to mechanical properties, and also reduces the chemical driving force for the formation of the titanium diboride. Conversion of titanium aluminide to titanium diboride in the presence of boron and aluminum can occur if the components are held at temperatures above the melting point of aluminum.

The starting powders must be protected from extensive oxidation due to exposure to the atmosphere, as this will restrict the diffusion of the components into the metal matrix, and the reaction should preferably be carried out under an inert gas to avoid oxidation at high temperatures.

The particle size of the powders utilized in the elemental powder mode does not appear to be critical. It has been found, however, that particle size of the ceramic reaction product is dependent upon heat-up rate, reaction temperature, cool-down rate, and crystallinity and composition of the starting materials. Appropriate powder sizes may range from less than 5 microns to more than 200 microns. For economic reasons, one normally may utilize larger particle size powders. It has been found that the particle size of the precipitated ceramic phase in the matrix may vary from less than about 0.01 microns to about 5 microns or larger, dependent upon the factors cited above.

It has been found that some specific reactant properties have a greater impact than powder particle size on the particle size of the cermic produced. For example, the use of amorphous boron results in the precipitation of a finer grain size titanium diboride than does the use of crystalline boron of otherwise comparable nature. The precipitation of specific grain size ceramic phase may be selectively controlled by proper control of starting composition, temperature of reaction, and cool-down rate.

The production of relatively porous composites, containing high concentrations of the ceramic phase, provides a technique for the production of high purity ceramic powders of desired particle sizes. This may be achieved by selective dissolution of the matrix metal, yielding a suspension of ceramic powder in the dissolution medium. If the medium is an appropriate acid or caustic solution, one may then recover the finely divided ceramic powder. If, on the other hand, the dissolution medium is another metal, one may obtain a dispersion of a ceramic phase in a matrix in which it may not be directly precipitated. For example, titanium can be reinforced by precipitating titanium diboride in aluminum, and subsequently dissolving the titanium diboride/aluminum composite in titanium.

Examples 1 and 2 illustrate the precipitation of fine particles of titanium diboride in aluminum by powder-powder mode reactions, in the liquid state and in the solid state.

EXAMPLE 1

Figure 4:
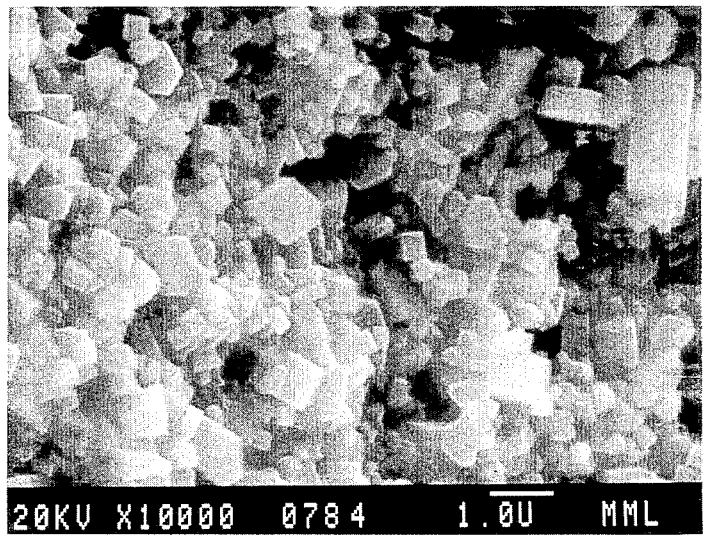
FIG. 4 constitutes a photomicrograph of a disperson of titanium diboride in aluminum, prepared in accordance with the present invention.

A mixture of 34 percent by weight of titanium powder, 16 percent by weight of boron and 50 percent by weight of aluminum was isostatically compacted to 38,000 pounds per square inch. The compacted artifact was then heated in a furnace set at a temperature of 800° C. Upon reaching approximately 670° C., a rapid increase in temperature to approximately 1250° C. was noted. The rate of increase in temperature was very rapid (greater than 900° C. per minute) followed by a fast cool down rate of approximately 400° C. per minute. On subsequent examination the sample was found to contain a fine dispersion (0.1–3 microns) of titanium diboride particles in an aluminum matrix. A photomicrograph of this composite is shown as FIG. 4.

EXAMPLE 2

A mixture of 20.5 percent titanium, 9.5 percent boron and 70 percent by weight cobalt was isostatically pressed to 40,000 pounds per square inch and heated in a furnace. A highly exothermic reaction occurred at 800° C., with a temperature rise to about 1600° C. Subsequent x-ray analysis identified the presence of titanium diboride in a cobalt matrix. It was shown here that if sufficient diffusion of the reactive species can occur, the initiation temperature can be below the melting point of the matrix metal, which in this case is 1495° C., and the reaction may occur in the solid state.

The alloy-alloy reaction, in the liquid state, is exemplified by Examples 3 and 4, described below.

EXAMPLE 3

Two separate aluminum alloys, one containing 10 percent titanium, and the other 4 percent boron, by weight, were placed in an alumina crucible and heated to 1400° C. for one hour under an argon atmosphere. Mixing of the alloys occurred through diffusion and thermal effects. The experiment was performed at 1400° C. to ensure that all of the titanium and boron were dissolved, thereby allowing the titanium diboride to fully precipitate, being considerably less soluble than the individual elements. Subsequent SEM/EDS analysis of the metal matrix composite produced identified a submicron $TiB_2$ dispersion in the aluminum matrix. While this experiment was intended to completely dissolve the titanium aluminide and aluminum boride such that all the titanium and boron were held in solution in the aluminum, it was recognized that because of its limited solubility titanium diboride would precipitate at any temperature above the melting point of the solvent metal, even if not all of the alloys were dissolved.

EXAMPLE 4

To support the contention that it was necessary to fully dissolve the titanium and boron in the alloys, three equivalent experiments to Example 3 were performed, except that the maximum temperatures achieved were limited to 1200° C., 1000° C. and 800° C. respectively. As in Example 3 finely dispersed $TiB_2$ particles were observed in the aluminum matrix, in all cases.

The following Example 5 describes the production of aluminum/titanium diboride composites by alloy-alloy reaction, in the plasma state.

EXAMPLE 5

In this example the reaction is achieved by striking an arc between two electrodes, each containing the metal matrix and one of the reactive species, in a closed vessel. The relative positions of the electrodes is adjusted to achieve the passing of the arc. The said electrodes may also be rotated as to achieve even melting. Atomizing the homogenized molten metal into powder can be achieved in air, but is preferably performed in a non-reactive atmosphere such as an inert gas or a vacuum. Alternatively, the molten metal may be collected in a heated container placed below the arc to obtain an ingot.

The reaction between the ceramic constituents within the arc yields a ceramic compound which is mixed with the matrix metal. Due to the very rapid heat up and cool down rates associated with this process, a very fine distribution of ceramic particles in the metallic matrix is achieved. Striking an arc in the above manner between two electrodes, one of which contains aluminum and titanium and the other aluminum and boron, results in the formation of a fine dispersion of titanium diboride in a molten aluminum droplet which solidifies as it drops through the inert gas. The powder thus produced can be subsequently processed by conventional powder metallurgical techniques. In a different variant of this process, the molten metal droplets are collected in a heated crucible to produce an ingot for conventional metal working operations. In yet another variant the droplets are collected on a chilled rotating drum to produce metal-ceramic flakes.

The following example teaches the influence of amorphous boron on the particle size of titanium diboride precipitated in an aluminum matrix.

EXAMPLE 6

An identical mixture (but for the use of amorphous boron instead of crystalline boron) as that described in Example 1 was prepared (i.e. approximately 34% by weight of titanium, 16% by weight of boron and 50% by weight of aluminum), compacted, and heated in a furnace. At a temperature of about 620° C., a rapid exotherm was noted. Subsequent examination revealed the presence of very fine 0.01-1.0 micron titanium diboride particles in an aluminum matrix.

The high concentration composite prepared in either Example 1 or Example 6 is suitable for use as a master concentrate for subsequent dilution to achieve dispersion hardening of metal/alloy systems.

The following examples teach the use of one matrix solvent to induce precipitation in a second, higher melting point matrix.

EXAMPLE 7

A mixture of 16 percent by weight of aluminum, 56 percent by weight of chromium, 20.6 percent by weight titanium and 9.4 percent by weight of boron was compacted and subsequently heated in a furnace. On attainment of a temperature of about 620° C., a rapid reaction occurred, resulting in a temperature increase to over 800° C. and melting of the chromium matrix. The temperature-time curve showed a double peak, indicating an exothermic reaction in aluminum (which typically occurs between 600°-680° C.) and a subsequent reaction in the chromium. The lower melting matrix therefore acted as a "low temperature initiator" for the reaction, which released heat and induced further reaction in the higher melting compound. Titanium diboride in a matrix of chromium-aluminum alloy was identified in the composite produced.

EXAMPLE 8

A mixture of 20.6 percent by weight of titanium, 9.4 percent by weight boron and 70 percent by weight of chromium was compacted to 40,000 pounds per square inch, and then heated in a furnace. A rapid exothermic reaction was noted at approximately 880° C. This temperature is 260° C. above that at which the same proportions of titanium and boron react when 20 percent of the matrix is made up of aluminum. As in the case of Example 7, titanium diboride was identified by x-ray analysis.

The following examples illustrate various characteristics and aspects of the invention as discussed hereinabove.

EXAMPLE 9

An experiment was conducted whereby zirconium diboride was precipitated in a matrix of copper. A mixture of approximately 24 percent zirconium, 11 percent boron, and 65 percent aluminum powders by weight was compacted, and, then heated in a furnace. On attainment of a temperature of 830° C., rapid reaction occurred to a temperature maximum of about 970° C. Subsequent X-ray and SEM analysis showed the presence of zirconium diboride in a Cu matrix.

EXAMPLE 10

An experiment was conducted, whereby molybdenum disilicide was precipitated in an aluminum matrix. A mixture of approximately 7.5 percent silicon, 12.5 percent molybdenum, and 80 percent aluminum powders by weight was compacted and subsequently heated in a furnace. On attainment of a temperature of approximately 640° C., a sudden exotherm was noted. Subsequent X-ray and SEM analyses confirmed the presence of molybdenum disilicide in an aluminum matrix.

EXAMPLE 11

A mixture of 20.4 percent titanium, 9.6 percent boron and 70 percent by weight of lead was compacted to 40,000 pounds per square inch and then heated to 450° C. No exotherm was noted and subsequent x-ray analysis identified only the unreacted elemental powders. This behavior illustrates, as others have shown, that there is no solubility of boron in lead and thus no diffusion of boron in the lead can occur to react with the titanium. In contrast to such behavior, a silicon, titanium and lead mixture does produce titanium disilicide in lead, as both silicon and titanium have a finite solubility in lead which enables diffusion and reaction to occur.

EXAMPLE 12

A mixture of nickel, aluminum, titanium and boron in the stoichiometric proportions for the formation of nickel aluminide ($Ni_3Al$) and titanium diboride ($TiB_2$), i.e. 10 percent by weight aluminum, 62 percent by weight nickel, 19 percent by weight titanium and 9 percent by weight boron, were compacted to 40,000 pounds per square inch, and then heated in a furnace. Upon reaching 620° C., a rapid exotherm was noted which, subsequent analysis by x-ray diffraction and scanning electron microscopy identified as resulting from the formation of titanium diboride particles in a nickel aluminum matrix. It was evident from this experiment that a ceramic phase, e.g. titanium diboride could be precipitated in a intermetallic phase, e.g. nickel aluminide, provided the affinity of the ceramic-forming species for each other is greater than either has for the two elements making up the intermetallic matrix.

Additional experiments were conducted to produce a variety of metal matrix composites, as set forth in Table II which follows.

TABLE II

| Ceramic Phase (wt %) | Matrix | Reactants (wt %) | Initiation Temp. ° | Maximum Temp. °C. | Particle Size (μm) |
|---|---|---|---|---|---|
| $TiB_2$-100 | None | Ti-69, B-31 | No reaction up to 1200° | | |
| $TiB_2$-95* | Al | Ti-65.6, B-29.4, Al-5.0 | 580 | 730 | |
| $TiB_2$-90 | Al | Ti-62, B-28, Al-10 | 580 | 1120 | |
| $TiB_2$-80 | Al | Ti-55.2, B-24.8, Al-20 | 590 | 1625 | 1–3 |
| $TiB_2$-60 | Al | Ti-41.4, B-18.6, Al-40 | 680 | 1450 | 1–3 |
| $TiB_2$-50 | Al | Ti-35, B-15, Al-50 | 780 | 1488 | 1–5 |
| $TiB_2$-40 | Al | Ti-27.6, B-12.4, Al-60 | 680 | 1380 | |
| $TiB_2$-32 | Al | Ti-22, B-10, Al-68 | 780 | 1200 | 1–5 |
| $TiB_2$-30 | Al,Mg | Ti-20, B-5, Mg-5, Al-70 | N/A | N/A | 0.1–5 |
| $TiB_2$-21 | Al,Zn,Mg,Cu | Ti-14.5, B-6.7, Zn-6, Mg-5, Cu-1, Al-68 | N/A | N/A | 0.1–5 |
| $TiB_2$-60 | Al—Mg | Ti-41.4, B-18.6, Al—Mg-40 | 610 | 1350 | 1–2 |
| $TiB_2$-47.5 | Al—Mg,Zn,Cu | Ti-33, B-14.5, Zn-3.2, Cu-0.5, Al—Mg-48.8 | 610 | Thermocouple Failed | |
| $TiB_2$-28 | Al—Mg,Zn,Cu | Ti-19.3, B-8.8, Zn-5.6, Cu-0.9, Al—Mg-65.4 | 600 | 905 | 1.0 |
| $TiB_2$-22 | Al—Mg,Zn,Cu | Ti-14.5, B-7.1, Zn-6, Cu-1, Al—Mg-71.4 | N/A | N/A | <0.1–2 |
| $TiB_2$-21 | Al—Mg,Zn,Cu | Ti-14.6, B-6.8, Zn-6, Cu-1, Al—Mg-71.6 | 680 | ~1000 | <0.1 |
| $Zr_5Si_3$-30 | Al | Zr-18.6, Si-11.4, Al-70 | 570 | 870 | |
| $ZrB_2$-26 | Al | Zr-21, B-5, Al-74 | N/A | N/A | 0.5–5 |
| $ZrB_2$-24 | Al,Mg | Zr-19, B-5, Mg-7, Al-69 | N/A | N/A | 0.1–1.5 |
| $Zr_5Si_3$-35 | Al | Zr-23.5, Si-10.5, Al-66 | 570 | 870 | |
| $MgB_2$-30 | Al | Mg-15.8, B-14.2, Al-70 | No Reaction | | |
| $MoSi_2$-20 | Al | Mo-12.6, Si-7.4, Al-80 | N/A | N/A | 0.01–5 |
| $MoB_2$-27 | Al | Mo-22, B-5.4, Al-73 | N/A | N/A | 0.01–3 |
| $MoB_2$-25 | Al,Mg | Mo-20, B-5, Mg-7, Al-68 | N/A | N/A | 0.01–3 |
| WC-30 | Al | W-28.2, C-1.8, Al-70 | 640 | 700 | 0.15–1 |
| $Cr_3C_2$-30 | Al | Cr-24.4, C-5.6, Al-70 | 630 | 720 | |
| $VSi_2$-60 | Al | V-28.6, Si-31.4, Al-40 | 820 | 1300 | |
| VC-60 | Al | V-48.6, C-11.4, Al-40 | 780 | 860 | |
| $VB_2$-60 | Al | V-42.2, B-17.8, Al-40 | 700 | 860 | 0.25–1** |
| $TiB_2$-80 | Cu | Ti-55.2, B-24.8, Cu-20 | 580 | 1290 | <0.1–1.5  14 |
| $TiB_2$-30 | Cu | Ti-20.6, B-9.4, Cu-70 | 820 | 1320 | <0.1–2.0 |
| $TiB_2$-30 (Hot Pressed) | Cu | Ti-20.6, B-9.4, C-70 | 780 | 1240 | 0.1–0.5 |
| $TiB_2$-23 | Cu,Zn | Ti-15.8, B-7.2, Zn-23.1, Cu-53.8 | 820 | 1190 | <0.5 |
| SiC-60 | Cu | Si-42, C-18, Cu-40 | N/A | N/A | |
| $ZrB_2$-30 | Cu | Zr-24.2, B-5.8, Cu-70 | 830 | 870 | <0.2–1 |
| $ZrB_2$-60 | Cu | Zr-48.6, B-11.4, Cu-40 | 870 | 1100 | |
| $ZrSi_2$-30 | Cu | Zr-18.6, Si-11.4, Cu-70 | 770 | 940 | 0.05–0.5 |
| $Cr_3C_2/Cr_7C_3$-60 | Cu | Cr-52, C-8, Cu-40 | N/A | N/A | |
| $Mo_2C$-60 | Cu | Mo-56.4, C-3.6, Cu-40 | N/A | N/A | |
| $MoSi_2$-30 | Cu | Mo-19, Si-11, Cu-70 | 760 | 780 | <0.1–0.5 |
| VC-60 | Cu | V-48.6, C-11.4, Cu-40 | 1020 | 1140 | |
| $VB_2$-60 | Cu | V-42.2, B-17.8, Cu-40 | 1020 | 1230 | |
| $AlTi_2$-60 | Cu | Ti-50.6, Al-9.4, Cu-40 | 510 | 830 | |
| $TiB_2$-30 | Cr | Ti-20.6, B-9.4, Cr-70 | 880 | >1100 | |
| $TiB_2$-30 | Fe | Ti-20.7, B-9.3, Fe-70 | N/A | N/A | <0.1–1.0 |
| $TiB_2$-30 (Hot Pressed) | Fe | Ti-20.7, B-9.3, Fe-70 | 1150 | 1300 | 0.1–0.5 |
| $Mo_5Si_3$-30 | Fe | Mo-19, Si-11, Fe-70 | 1060 | 1130 | |
| $TiB_2$-30 | Mg | Ti-20.7, B-9.3, Mg-70 | N/A | N/A | <0.1 |
| $TiSi_2$-32 | Mg | Ti-14.6, Si-17.1, Mg-68.3 | 350 | 490 | |
| ZrC-60 | Ni | Zr-47.6, C-12.4, Ni-40 | N/A | N/A | |
| $TiB_2,Ti_2Ni$-60 | Ni | Ti-20.6, B-9.4, Ni-70 | N/A | N/A | |
| TiC-60 | Ni | Ti-48, C-12, Ni-40 | 1000 | 1370 | |
| $TiB_2$-30 | Cr—Al | Ti-20.6, B-9.4, Al-14, Cr-56 | 620 | 1400 | |
| $TiB_2$-30 | Co—Al | Ti-20.6, B-9.4, Al-14, Co-56 | 590 | 1080 | 0.1–1.5 |
| $TiB_2$-30 | Ni—Al | Ti-20.6, B-9.4, Al-14, Ni-56 | 600 | 1600 | |
| $TiB_2$-30 | Co | Ti-20.6, B-9.6, Co-70 | 800 | 1400 | |
| TiC-60 | Co | Ti-48, C-12, Co-40 | 1050 | >1450 | 0.1–0.3 |
| $TiSi_2$-60 | Co | Ti-27.6, Si-32.4, Co-40 | N/A | N/A | |
| $ZrB_2$-60 | Co | Zr-48.6, B-11.7, Co-40 | 900 | >1500 | |
| $ZrSi_2$-60 | Co | Zr-37.2, Si-22.8, Co-40 | 930 | Thermocouple failed | |
| $Mo_5Si_3$-60 | Co | Mo-37.8, Si-22.2, Co-40 | 970 | 1070 | |
| WC-60 | Co | W-56.4, C-3.6, Co-40 | N/A | N/A | |
| $WSi_2$-60 | Co | W-46.0, Si-14.0, Co-40 | 980 | 1080 | |
| $TiB_2$-30 | MarM322*** | Ti-20.6, B-9.4, MarM-70 | 920 | 1330 | |
| $TiB_2$-40 | 316 Stainless+ | Ti-26.4, B-13.6, 316-60 | 960 | Thermocouple failed | |
| $TiB_2$-40 | 304 Stainless+ | Ti-26.4, B-13.6, 304-60 | 960 | Thermocouple failed | |
| $TiB_2$-30 | Si | Ti-20.6, B-9.4, Si-70 | N/A | N/A | 0.5–2 |
| $TiB_2$-24++ | Ti | Ti-90, B-10 | N/A | N/A | 5–100 |
| $TiB_2$-31++ | Ti,V | Ti-81, B-13, V-6 | N/A | N/A | |
| $AlZr_2$-30 | Pb | Zr-27.4, Al-2.6, Pb-70 | N/A | N/A | |
| $TiSi_2$-30 | Pb | Ti-13.8, Si-16.2, Pb-70 | 440 | 480 | |
| $AlTi_2$-30 | Pb | Ti-11.2, Al-18.8, Pb-70 | 300 | 380 | |

*Ceramic phase not formed
**Whiskers formed also
***Nickel superalloy (Martin Marietta trademark)
+Stainless steel (AISI designation)
++Not fully reacted It is noted that the present invention has a number of advantages over methods taught by the prior art. For example, this invention circumvents the need for submicron, unagglomerated refractory metal boride starting materials, which materials are not commercially available, and are often pyrophoric. This invention also eliminates the technical problems of uniformly dispersing the ceramic in the solvent metal, and avoids the problem of oxide formation at the ceramic/metal interface during processing. Further, the present invention yields a metal matrix composite with a ceramic phase precipitated therein, having superior hardness and modulus qualities over currently employed additives such as silicon carbide. The metal matrix composite also has improved high temperature stability, in that the ceramic phase is not reactive with the metal matrix. Further, the metal matrix composite can be welded without degradation of material properties, and possesses superior corrosion resistance, when compared to any metal matrix composites presently available.

It is understood that the above description of the present invention is susceptible to considerable modification, change, and adaptation by those skilled in the art, and such modifications, changes, and adaptations are intended to be considered to be within the scope of the present invention, which is set forth by the appended claims.

We claim:

1. A method for the production of metal-ceramic composite materials containing a ceramic phase, said method comprising precipitating at least one ceramic material in a metal matrix by contacting reactive ceramic forming constituents, in the presence of a non-reactive solvent matrix metal in which said ceramic forming constituents are more soluble than said ceramic phase, at a temperature at which sufficient diffusion of said constituents into said solvent matrix metal occurs to cause reaction of said reactive ceramic forming constituents raising the temperature above the melting temperature of the matrix metal to precipitate said ceramic phase in said solvent matrix metal.

2. A method as set forth in claim 1, wherein the reaction is substantially complete.

3. A method as set forth in claim 1, wherein the reactive ceramic forming constituents and the solvent matrix metal are each provided as the individual elements.

4. A method as set forth in claim 1, wherein the ceramic phase is particulate.

5. A method as set forth in claim 4, wherein the particulate ceramic phase is precipitated in-situ.

6. A method as set forth in claim 1, wherein the ceramic-forming constituents are each provided as an alloy of said solvent matrix metal.

7. A method as set forth in claim 5, wherein the particulate ceramic phase is submicron in size.

8. A method as set forth in claim 6, wherein the ceramic forming constituents in the solvent matrix metal are contacted in substantially stoichiometric proportions.

9. A method as set forth in claim 1, wherein at least one ceramic forming constituent is provided as an alloy of the solvent matrix metal, and the other ceramic forming constituents are provided as the individual elements.

10. A method for precipitation of a ceramic phase in a metallic matrix, said method comprising the steps of:
 (a) preparing a mixture of reactive ceramic forming constituents and a substantially non-reactive solvent matrix metal in which said ceramic forming constituents are more soluble than said ceramic phase;
 (b) heating the mixture to a reaction initiation temperature approximating the melting point of the solvent matrix metal to initiate an exothermic reaction;
 (c) permitting said exothermic reaction to further heat the mixture and to form a uniform distribution of ceramic particles; and
 (d) recovering a product.

11. A method as set forth in claim 10, wherein at least one ceramic forming constituent is selected from transition metals of the third to sixth groups of the Periodic Table.

12. A method as set forth in claim 10, wherein at least one ceramic forming constituent is selected from aluminum, titanium, silicon, boron, carbon, sulfur, germanium, molybdenum, tungsten, vanadium, zirconium, and chromium.

13. A method as set forth in claim 12 wherein said solvent matrix metal is selected from aluminum, gallium, nickel, titanium, copper, vanadium, chromium, manganese, cobalt, iron, silicon, germanium, silver, gold, platinum, palladium, rhodium, ruthenium, magnesium, lead, zinc, tin, and alloys of such metals.

14. A method as set forth in claim 10, wherein the ceramic forming constituents and the solvent metal are provided as individual elements.

15. A method as set forth in claim 14, wherein said reaction takes place in the liquid state.

16. A method as set forth in claim 15, wherein the solvent matrix metal is selected from aluminum, zinc, magnesium, copper, lead, nickel, chromium, iron, titanium, cobalt, and alloys of such metals.

17. A method as set forth in claim 16, wherein at least one ceramic forming constituent is selected from aluminum, silicon, titanium, hafnium, tantalum, zirconium, magnesium, vanadium, nickel, and tungsten.

18. A method as set forth in claim 17, wherein at least one other ceramic forming constituent is selected from aluminum, boron, silicon, nitrogen, and carbon.

19. A method as set forth in claim 10, wherein the ceramic forming constituents are each provided as an alloy of the solvent matrix metal.

20. A method as set forth in claim 19, wherein said solvent matrix metal is selected from aluminum, zinc, magnesium, copper, lead, nickel, chromium, iron, titanium, cobalt, and alloys of such metals.

21. A method as set forth in claim 20, wherein said ceramic forming constituents are each selected from titanium, zirconium, magnesium, boron, silicon, and carbon.

22. A method as set forth in claim 10, wherein at least one ceramic forming constituent is provided as an individual element, and the other ceramic forming constituents are provided as alloys of the solvent matrix metal.

23. A method as set forth in claim 22, wherein said solvent matrix metal is selected from aluminum, zinc, magnesium, copper, nickel, chromium, iron, titanium, cobalt, and alloys of such metals.

24. A method as set forth in claim 23, wherein said ceramic forming constituents are each selected from aluminum, titanium, zirconium, magnesium, boron, silicon, and carbon.

25. A method for the uniform dispersion of ceramic dispersoids in a metal matrix, said method comprising forming a reaction mixture of reactive ceramic forming constituents in the presence of at least two solvent metals in which ceramic forming constituents are more soluble than said ceramic dispersoids, raising the temperature of said reaction mixture to a temperature at which sufficient diffusion of the ceramic forming constituents into the lowest melting solvent metal occurs to initiate reaction of said constituents, whereby the exothermic heat of reaction of said constituents causes the temperature of the reaction mixture to exceed the melting point of the matrix of the higher melting metal permitting uniform dispersion of said ceramic dispersoid in a matrix of higher melting metal or an alloy thereof.

26. A method as set forth in claim 25, wherein said lowest melting solvent metal is present as a minor proportion of a higher melting solvent metal.

27. A method as set forth in claim 26, wherein said higher melting solvent metal is selected from cobalt, chromium, nickel, titanium, vanadium, iron, and silicon.

28. A method as set forth in claim 27, wherein said lowest melting solvent metal is selected from aluminum, copper, tin, zinc, lead, and magnesium.

29. A method for the in-situ precipitation of at least one intermetallic material in a metallic matrix, said method comprising the steps of:
(a) preparing a mixture of reactive intermetallic forming constituents and a non-reactive solvent matrix metal in which said intermetallic forming constituents are more soluble than said intermetallic material;
(b) heating the mixture to a reaction initiation temperature approximating the melting point of the solvent matrix metal;
(c) permitting the resultant exothermic reaction to raise the temperature of said mixture to a temperature exceeding the melting point of the matrix metal and to consume intermetallic forming constituents; and
(d) recovering a product.

30. A method as set forth in claim 29, wherein at least one intermetallic forming constituent is selected from aluminum, titanium, silicon, nickel, vanadium, molybdenum, niobium, thorium, tungsten, zirconium, yttrium, lithium, and germanium.

31. A method as set forth in claim 30 wherein said solvent metal is selected from aluminum, gallium, nickel, titanium, copper, vanadium, chromium, manganese, cobalt, iron, silicon, germanium, silver, gold, platinum, palladium, rhodium, ruthenium, magnesium, lead, zinc, tin, and alloys of such metals.

32. A method for the in-situ precipitation of dispersoid particles of at least one intermetallic material and at least one ceramic material in a metal matrix, said method comprising the steps of:
(a) preparing a mixture of reactive intermetallic and ceramic forming constituents and a substantially non-reactive solvent matrix metal in which said intermetallic and ceramic forming constituents are more soluble than said intermetallic material and said at least one ceramic material, respectively;
(b) heating the mixture to a reaction initiation temperature approximating the melting point of the solvent matrix metal;
(c) permitting the resultant exothermic reaction to raise the temperature of the mixture to a temperature exceeding the melting point of the matrix metal and to consume intermetallic and ceramic forming constituents; and
(d) recovering a product.

33. A method as set forth in claim 32, wherein at least one intermetallic forming constituent and at least one ceramic forming constituent are selected from the group consisting of aluminum, titanium, silicon, nickel, vanadium, molybdenum, niobium, thorium, tungsten, zirconium, yttrium, lithium, germanium, boron, carbon, and nitrogen.

34. A method as set forth in claim 33 wherein said solvent metal is selected from aluminum, gallium, nickel, titanium, copper, vanadium, chromium, manganese, cobalt, iron, silicon, germanium, silver, gold, platinum, palladium, rhodium, ruthenium, magnesium, lead, zinc, tin, and alloys of such metals.

35. A method for the production of metal-ceramic composite materials containing a ceramic phase, said method comprising precipitating at least one ceramic material in a metal matrix by contacting reactive ceramic forming constituents, in the presence of a non-reactive solvent matrix metal in which said ceramic forming constituents are more soluble than said ceramic phase, at a temperature at which sufficient diffusion of said constituents into said solvent matrix metal occurs to cause reaction of said reactive ceramic forming constituents raising the temperature above the melting temperature of the matrix metal to precipitate a substantially uniform distribution of said ceramic phase in said solvent matrix metal.

36. A method for the in-situ precipitation of a substantially uniform distibution of at least one intermetallic material in a metallic matrix, said method comprising the steps of:
(a) preparing a mixture of reactive intermetallic forming constituents and a non-reactive solvent matrix metal in which said intermetallic forming constituents are more soluble than said intermetallic material;
(b) heating the mixture to a reaction initiation temperature approximating the melting point of the solvent matrix metal;
(c) permitting the resultant exothermic reaction to raise the temperature of said mixture to a temperature exceeding the melting point of the matrix metal and to consume intermetallic forming constituents; and
(d) recovering a product.

37. A method for the in-situ precipitation of a substantially uniform distribution of dispersoid particles of at least one intermetallic material and at least one ceramic material in a metal matrix, said method comprising the steps of:
(a) preparing a mixture of reactive intermetallic and ceramic forming constituents and a substantially non-reactive solvent matrix metal in which said intermetallic and ceramic forming constituents are more soluble than said intermetallic material and said at least one ceramic material, respectively;
(b) heating the mixture to a reaction initiation temperature approximating the melting point of the solvent matrix metal;
(c) permitting the resultant exothermic reaction to raise the temperature of the mixture to a temperature exceeding the melting point of the matrix metal and to consume intermetallic and ceramic forming constituents; and
(d) recovering a product.

38. A method for the production of metal-ceramic composite materials containing a ceramic phase, said method comprising precipitating at least one ceramic material in a metal matrix by contacting reactive ceramic forming constituents, in the presence of a non-reactive solvent matrix metal in which said ceramic forming constituents are more soluble than said ceramic phase, at a temperature at which sufficient diffusion of more than a localized portion of said constituents into said solvent matrix metal occurs to cause reaction of said reactive ceramic forming constituents raising the temperature of said reactive ceramic forming constituents above the melting temperature of the matrix metal to precipitate said ceramic phase in said solvent matrix metal.

39. A method for precipitation of a ceramic phase in a metallic matrix, said method comprising the steps of:
(a) preparing a mixture of reactive ceramic forming constituents and a substantially non-reactive solvent matrix metal in which said ceramic forming constituents are more soluble than said ceramic phase;
(b) heating more than a localized portion of the mixture to a reaction initiation temperature approximating the melting point of the solvent matrix metal to initiate an exothermic reaction;
(c) permitting said exothermic reaction to further heat the mixture and to form ceramic particles; and
(d) recovering a product.

40. A method for the substantially uniform dispersion of ceramic dispersoids in a metal matrix, said method comprising forming a reaction mixture of reactive ceramic forming constituents in the presence of at least two solvent metals in which ceramic forming constituents are more soluble than said ceramic dispersoids, raising the temperature of more than a localized portion of said reaction mixture to a temperature at which sufficient diffusion of the ceramic forming constituents into the lowest melting solvent metal occurs to initiate reaction of said constituents, whereby the exothermic heat of reaction of said constituents causes the temperature of the reaction mixture to exceed the melting point of the matrix of the higher melting metal permitting substantially uniform dispersion of said ceramic dispersoid in a matrix of higher melting metal or an alloy thereof.

41. A method for the in-situ precipitation of at least one intermetallic material in a metallic matrix, said method comprising the steps of:
(a) preparing a mixture of reactive intermetallic forming constituents and a non-reactive solvent matrix metal in which said intermetallic forming constituents are more soluble than said intermetallic material;
(b) heating more than a localized portion of the mixture to a reaction initiation temperature approximating the melting point of the solvent matrix metal;
(c) permitting the resultant exothermic reaction to raise the temperature of said mixture to a temperature exceeding the melting point of the matrix metal and to consume intermetallic forming constituents; and
(d) recovering a product.

42. A method for the in-situ precipitation of dispersoid particles of at least one intermetallic material and at least one ceramic material in a metal matrix, said method comprising the steps of:
(a) preparing a mixture of reactive intermetallic and ceramic forming constituents and a substantially non-reactive solvent matrix metal in which said intermetallic and ceramic forming constituents are more soluble than said intermetallic material and said at least one ceramic material, respectively;
(b) heating more than a localized portion of the mixture to a reaction initiation temperature approximating the melting point of the solvent matrix metal;
(c) permitting the resultant exothermic reaction to raise the temperature of the mixture to a temperature exceeding the melting point of the matrix metal and to consume intermetallic and ceramic forming constituents; and
(d) recovering a product.

43. A method for precipitation of a ceramic phase in a metallic matrix, said method comprising the steps of:
(a) preparing a mixture of reactive ceramic forming constituents and a substantially non-reactive solvent matrix metal in which said ceramic forming constituents are more soluble than said ceramic phase;
(b) heating the mixture to a reaction initiation temperature approximating the melting point of the solvent matrix metal to initiate an exothermic reaction;
(c) permitting said exothermic reaction to further heat the mixture and to form ceramic particles; and
(d) recovering a product.

* * * * *

UNITED STATES PATENT AND TRADEMARK OFFICE
CERTIFICATE OF CORRECTION

PATENT NO. : 4,710,348  Page 1 of 2
DATED : December 1, 1987
INVENTOR(S) : Brupbacher, J.M; Christodoulou, L.; Nagle, D.C.

It is certified that error appears in the above-identified patent and that said Letters Patent are hereby corrected as shown below:

On the cover sheet, the following References Cited should be inserted among the U.S. PATENT DOCUMENTS:

| | | | |
|---|---|---|---|
| 3,726,643 | 4/1973 | Merzhanov et al | 423/409 |
| 4,161,512 | 7/1979 | Merzhanov et al | 423/440 |
| 4,431,448 | 2/1984 | Merzhanov et al | 75/238 |

The following References Cited should be inserted among the OTHER PUBLICATIONS:
Dense Refractories Without Compaction, A.P. Hardt, Research and Development Division, Lockheed Missiles and Space Co., Inc. DARPA/ARMY SYMPOSIUM on SHS, (Oct. 1985), Daytona Beach, Florida
Powders That Explode Into Materials, Laurel M. Sheppard, 2/86, Advanced Materials and Processes, pp. 25-32
Self-Propagating High Temperature Synthesis of Ceramics in Vacuum, William F. Henshaw, April, 1984
Propagation of Gasless Reactions in Solids - I. Analytical Study of Exothermic Intermetallic Reaction Rates, A.P. Hardt and P.V. Phung, Combustion and Flame 21, 79-89 (1973)
Propagation of Gasless Reactions in Solids - II. Experimental Study of Exothermic Intermetallic Reaction Rates, A.P. Hardt and R. W. Holsinger, Combustion and Flame 21, 91-97 (1973).

Column 3, line 33, "dispersion" should read: --dispersion--. Column 6, line 62, cancel beginning "to heat more" to and including "known techniques." Column 7, line 1, following "735°C" insert --to heat more than a localized portion of the mixture to initiate reaction unlike known techniques--. In column 8, lines 49-50, "solvent-/matrix" should read --solvent/matrix--. Column 17, lines

UNITED STATES PATENT AND TRADEMARK OFFICE
CERTIFICATE OF CORRECTION

PATENT NO. : 4,710,348

DATED : December 1, 1987

INVENTOR(S) : Brupbacher, J.M; Christodoulou, L.; Nagle, D.C.

It is certified that error appears in the above-identified patent and that said Letters Patent is hereby corrected as shown below:

66-67, in claim 33, cancel "the group consisting of."

Signed and Sealed this

Sixteenth Day of August, 1988

*Attest:*

DONALD J. QUIGG

*Attesting Officer*     *Commissioner of Patents and Trademarks*